(12) United States Patent
Kefti-Cherif et al.

(10) Patent No.: US 7,582,033 B2
(45) Date of Patent: Sep. 1, 2009

(54) INFINITELY VARIABLE TRANSMISSION WITH POWER BRANCHING, WITH ELECTRIC SELECTOR

(75) Inventors: Ahmed Kefti-Cherif, Elancourt (FR); Marc Picard, Rueil Malmaison (FR); Michel Buannec, Verneuil sur Seine (FR); Sebastien Chanson, Fontenay aux Roses (FR)

(73) Assignee: Renault S.A.S., Boulogne-Billancourt (FR)

( * ) Notice: Subject to any disclaimer, the term of this patent is extended or adjusted under 35 U.S.C. 154(b) by 202 days.

(21) Appl. No.: 10/533,954

(22) PCT Filed: Nov. 6, 2003

(86) PCT No.: PCT/FR03/03317

§ 371 (c)(1),
(2), (4) Date: Aug. 31, 2005

(87) PCT Pub. No.: WO2004/044456

PCT Pub. Date: May 27, 2004

(65) Prior Publication Data

US 2006/0111211 A1 May 25, 2006

(30) Foreign Application Priority Data

Nov. 8, 2002 (FR) .................................. 02 14040
Nov. 8, 2002 (FR) .................................. 02 14041
Nov. 14, 2002 (FR) .................................. 02 14241

(51) Int. Cl.
*F16H 3/72* (2006.01)

(52) U.S. Cl. ...................................... 475/5; 180/65.21

(58) Field of Classification Search ................ 180/65.1, 180/65.2, 65.3, 65.6, 65.21; 701/22; 903/909, 903/921, 923, 621; 475/3.5, 5
See application file for complete search history.

(56) References Cited

U.S. PATENT DOCUMENTS

| 5,558,588 | A | * | 9/1996 | Schmidt | 475/5 |
| 5,558,589 | A | * | 9/1996 | Schmidt | 475/5 |
| 5,571,058 | A | * | 11/1996 | Schmidt | 475/5 |
| 5,730,676 | A | * | 3/1998 | Schmidt | 475/5 |
| 5,935,035 | A | | 8/1999 | Schmidt | |
| 6,081,042 | A | * | 6/2000 | Tabata et al. | 290/45 |
| 6,090,005 | A | * | 7/2000 | Schmidt et al. | 475/5 |
| 6,358,173 | B1 | * | 3/2002 | Klemen et al. | 475/5 |
| 6,371,882 | B1 | * | 4/2002 | Casey et al. | 477/5 |
| 6,491,599 | B1 | * | 12/2002 | Schmidt | 475/5 |
| 6,527,658 | B2 | * | 3/2003 | Holmes et al. | 475/5 |
| 6,962,545 | B2 | * | 11/2005 | Larkin | 475/5 |
| 7,220,199 | B2 | * | 5/2007 | Anthoine et al. | 475/5 |

(Continued)

FOREIGN PATENT DOCUMENTS

DE 196 06 771 8/1997

(Continued)

*Primary Examiner*—David D. Le
(74) *Attorney, Agent, or Firm*—Oblon, Spivak, McClelland, Maier & Neustadt, P.C.

(57) ABSTRACT

An infinitely variable transmission with power shunting having at least two operating modes, whereof the components are distributed between two power paths connecting in parallel the heat engine to the vehicle wheels, including at least three planetary gear trains, two electrical machines, at least one reduction stage, and a control distributing differently the power between the two power paths based on the operating mode thereof.

29 Claims, 5 Drawing Sheets

U.S. PATENT DOCUMENTS

2002/0094898 A1\* 7/2002 Hata et al. .................... 475/5
2005/0064974 A1\* 3/2005 Bezian et al. .................. 475/5

FOREIGN PATENT DOCUMENTS

| DE | 197 39 906 | 3/1999 |
| DE | 199 09 424 | 8/2000 |
| EP | 1 097 830 | 5/2001 |
| FR | 2 823 156 | 10/2002 |

\* cited by examiner

138=P1:174
PS1:159
C1:161
137=P2:162
PS2:161
C2:175

141=Pc:176
Cc:177
PSc:168
142=Pb:178
PSb:160
Cb:179

INFINITELY VARIABLE TRANSMISSION WITH POWER BRANCHING, WITH ELECTRIC SELECTOR

BACKGROUND OF THE INVENTION

I. Field of the Invention

The present invention relates to a power-splitting transmission, by means of which there can be achieved a continuous variation from reverse gear to forward gear, passing through a particular position referred to as "neutral engaged", wherein the travel speed of the vehicle is zero for any speed whatsoever of the internal combustion engine.

More precisely, its object is a power-splitting infinitely variable transmission on the basis of an electric variator and of a compound gearset, plus adjusting means that distribute the power between the input and output of the transmission differently depending on the mode of operation thereof.

II. Description of Related Art

Power-splitting transmissions can be based on three known principles or modes of power splitting. According to the first mode, known as "coupled-input", the transmission is provided with a pair of power-splitting pinions for splitting the power at the input of the mechanism, and with an "assembler" epicyclic gearset, which recombines the powers at the output of the mechanism. The control element is a variator.

In power-splitting transmissions of the "coupled-output" type, there is provided, for example, a power-dividing planetary gearset at the input of the mechanism and a power-reassembling pair of pinions at the output of the mechanism, the control element again being a variator.

Finally, in power-splitting transmissions of the "two matching points" type, a first power-dividing epicyclic gearset can be placed at the gearbox input while a second power-reassembling epicyclic gearset is disposed at the gearbox output, the control element again being a variator.

The traditional infinitely variable transmissions (I.V.T.) use only one or two of these three operating principles.

From U.S. Pat. Nos. 5,558,589 and 5,935,035 there are known infinitely variable transmissions with two modes of operation combining at least two planetary gearsets, two mode-changing clutches and one electric variator, using the coupled-output power-splitting principle as the first mode of operation.

According to these patents, the mode-changing means are disposed outside the epicyclic gearsets.

The merit of having two modes of operation available lies in the increased range of transmission ratios and in the possibility of reducing the size of the electric variator, which can be composed on the basis of electric machines.

Nevertheless, in these known two-mode architectures, the mode changes are effected by multiple-disk clutches disposed on the output of the transmission, and for this reason are accompanied by torque jolts that are sensed as unpleasant by the users.

Another disadvantage of the architectures described in these patents lies in their complexity, in particular related to the presence of at least two clutches and one brake.

In previous French Patent Application 01-04690 in the name of the same Applicant, there was described a power-splitting infinitely variable transmission with two modes of operation, wherein the architecture is simpler than in the traditional transmissions of the same type, electric machines of small dimensions are used, and the mode changes thereof are not accompanied by any torque jolt. In this French Patent Application 01-04690, the mode changes are effected by acting on internal mechanical links of the transmission situated between the two gearsets. For this purpose, two reducing stages are disposed between the two epicyclic gearsets, these stages being respectively utilized in the first and in the second mode of operation. These two reducing stages are disposed in parallel between the gearsets on the same power train.

Application of these prior art teachings poses the problem of an infinitely variable transmission (I.V.T.) that is sufficiently compact that it can be disposed easily in a motive power unit of a vehicle.

In addition, such an infinitely variable transmission is difficult to use with an internal combustion engine that produces high torque and power, and it cannot be easily matched to the type of engine, whether it be gasoline or diesel.

The prior art leads to design problems for the hydraulic actuation circuit, which then poses major problems during repair and maintenance of the gearbox, particularly in the case in which the mode-changing system is constructed in the form of a multiple-disk clutch.

In the case in which the mode-changing system is provided with mechanical gearbox claws, there are problems for exchanging the mode-changing system inside the gearbox.

Finally, the matching of such a gearbox to a gasoline-powered internal combustion engine also poses a problem related to the speeds of rotation, which are very high, thus imposing large mechanical stresses on certain spinning elements.

In fact, the engine speeds of a gasoline engine are higher than those of a diesel engine, in such a way that certain elements of the gearbox spin very rapidly.

The problem posed by the rapid rotation of a gear part will be seen in particular in the description hereinafter.

BRIEF SUMMARY OF THE INVENTION

These disadvantages of the prior art can be remedied by the present invention.

In particular, it consists in proposing a means by which space can be left for the electric variator.

The mode-changing system can be disposed on the periphery of the gearbox, in such a way that it can be adjusted more easily by means of hydraulic actuators or electromechanical actuators.

Finally, the operating speeds of the gearbox can be reduced by the adopted transmission structure.

To this end, the present invention relates to a power-splitting infinitely variable transmission, which is provided with a primary power train composed of two epicyclic gearsets connected by a compound gearset having two connections.

By virtue of such a structure, it has therefore been possible to replace the two reducing stages and the simple gearset of the prior art by an assembly composed of two reducing stages and a compound gearset.

The present invention also relates to a power-splitting infinitely variable transmission with two modes of operation, wherein the constituent elements of are distributed between two power trains connecting the internal combustion engine in parallel manner to the wheels of the vehicle, these means including two epicyclic gearsets, two electric machines, one reducing stage and adjusting means that distribute the power between the two power trains differently depending on the mode of operation thereof. This infinitely variable transmission is provided with a third epicyclic gearset in series with one of the two epicyclic gearsets on one of the two power trains, the said third epicyclic gearset cooperating with the said adjusting means in such a way that, in a first mode of operation, all elements of the third gearset are spinning at the same speed.

The invention also proposes that the infinitely variable transmission be provided with a first compound gearset by means of which the internal combustion engine can be connected to the wheels of the vehicle according to a main power-splitting train and with a simple gearset by means of which power splitting can be achieved as well as with a compound gearset in such a way as to achieve a system for changing mode between at least two modes of operation of the infinitely variable transmission.

BRIEF DESCRIPTION OF THE DRAWINGS

Other characteristics and advantages of the present invention will be better understood by means of the description and of the attached figures, wherein.

DETAILED DESCRIPTION OF THE INVENTION

Figure 1:
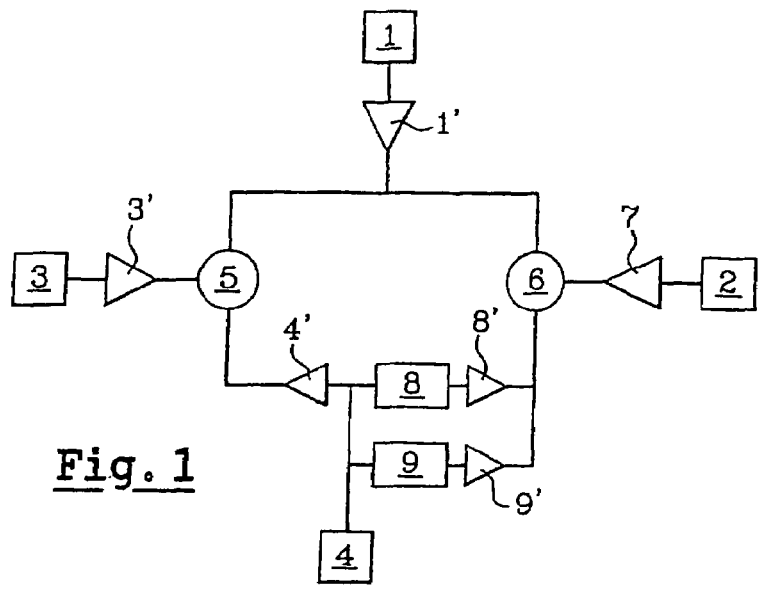
FIG. 1 and FIG. 2 are basic diagrams describing the prior art on which the present invention is based.

FIG. 1 illustrates the basic diagram of the infinitely variable transmission of French Patent Application 01.04690.

The transmission of FIG. 1 is composed of two epicyclic gearsets 5, 6, seven reducing stages 7, two mode-changing systems 8 and 9, which can be either claw couplings or multiple-disk clutches, and two electric machines 2, 4, together comprising a variator.

This transmission has four input and output connections, which can be connected respectively to internal combustion engine 1, to wheels 3 and to the two electric machines 2 and 4.

Internal combustion engine 1 is connected to a reducing stage 1'. Wheels 3 are connected to two reducing stages 3'. A first electric machine 2 of the variator is connected to a reducing stage 7 and a second electric machine 4 is connected to a reducing stage 4' and to two mode-changing systems 8 and 9.

Three reducing stages are connected to first epicyclic gearset 5. Four reducing stages are connected to second epicyclic gearset 6. One reducing stage 8' or 9' is connected to each of the mode-changing systems 8 and 9.

The transmission illustrated by FIG. 1 is therefore provided with seven reducing stages, five of which are disposed between the two epicyclic gearsets and two of which are disposed outside these said gearsets.

Internal combustion engine 1 is connected to epicyclic gearset 5 via a reducing stage 1', and wheels 3 are connected to each epicyclic gearset 5, 6 via a reducing stage 3'.

This transmission has two modes of operation with two matching points. In the first mode, first mode-changing system 8, connected to the reducing stages on the one hand and to an electric machine 4 on the other hand, is open. This first branch is therefore free, whereas the second, containing second mode-changing system 9, connected just as the first to two reducing stages and to electric machine 4, is closed.

Figure 2:
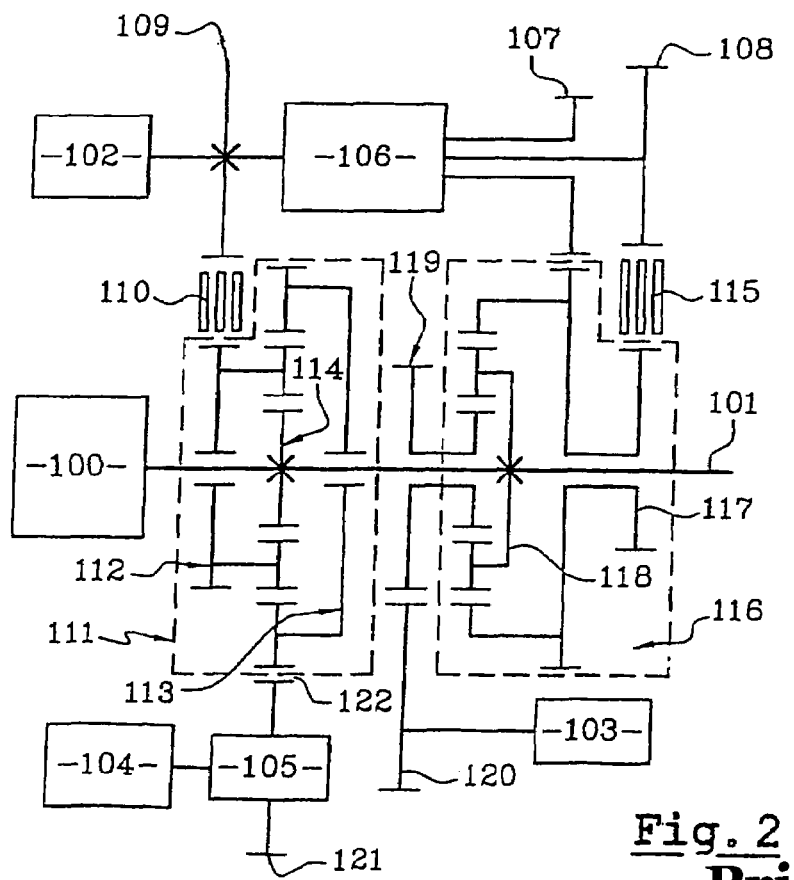

FIG. 2 illustrates a practical mechanical embodiment of the basic diagram of FIG. 1.

In FIG. 2, internal combustion engine 100 is connected to a central shaft 101, which traverses the entire mechanism of the gearbox, whose pinions and epicyclic gearsets have been represented schematically.

The electric variator is composed essentially of a first electric machine 102 and of a second electric machine 103.

Electric machines 102 and 103 can function equally well as motors or generators and are preferably connected to an electrical energy storage element such as a battery and/or a high-value capacitor.

Finally, the gearbox is connected via a differential 105 to wheels 104 of the vehicle.

The gearbox or infinitely variable transmission of the invention is provided essentially with a first epicyclic gearset 111 and a second epicyclic gearset 116.

It is also provided with a mode-changing system 106.

Planet carrier 112 is mounted to rotate freely around traversing central shaft 101 by means of a suitable bearing. The planet gears of planet carrier 112 are disposed in such a way that they can be coupled on the one hand to sun gear 114, which is integral with shaft 101, and on the other hand to ring gear 113, which spins freely around a bearing disposed on traversing shaft 101.

Planet carrier 112 of first epicyclic gearset 111 is driven by an external toothing by means of a chain 110 connected to a pinion 109 integral with the output shaft of first electric machine 102 of the electric variator.

Ring gear 113 of the first epicyclic gearset has an external toothing 122, which meshes with a driving pinion 121 of differential 105 connected to wheels 104.

The coupling of toothing 122 and pinion 121 produces a reducing stage 3'.

Second epicyclic gearset 116 is provided with a ring gear 117, a first toothing of which is coupled by a chain 115 to a pinion 108 driven by mode-changing system 106.

Sun gear 119 of second epicyclic gearset 116 is provided with an internal toothing and an external toothing.

The internal toothing of sun gear 119 is coupled to the planet gears of planet carrier 118, while the external toothing of sun gear 119 is connected to a driving pinion 120 of second electric machine 103 of the electric variator of the infinitely variable transmission.

Ring gear 117 also has an external toothing, which is coupled to another pinion 107 adjusted by mode-changing system 106, in such a way that the output shaft of first electric machine 102 can be coupled selectively either to pinion 107 or to pinion 108. Mode-changing system 106 is implemented:

either by means of claw couplings activated by a suitable drive system;

or by two clutches activated by suitable actuators.

This change of mode makes it possible to introduce two different reduction ratios K5 and K6 depending on whether the mode-changing system activates pinion 108 or pinion 107 and also to implement two different power pathways or trains in order to achieve a two-mode infinitely variable transmission.

Figure 3:
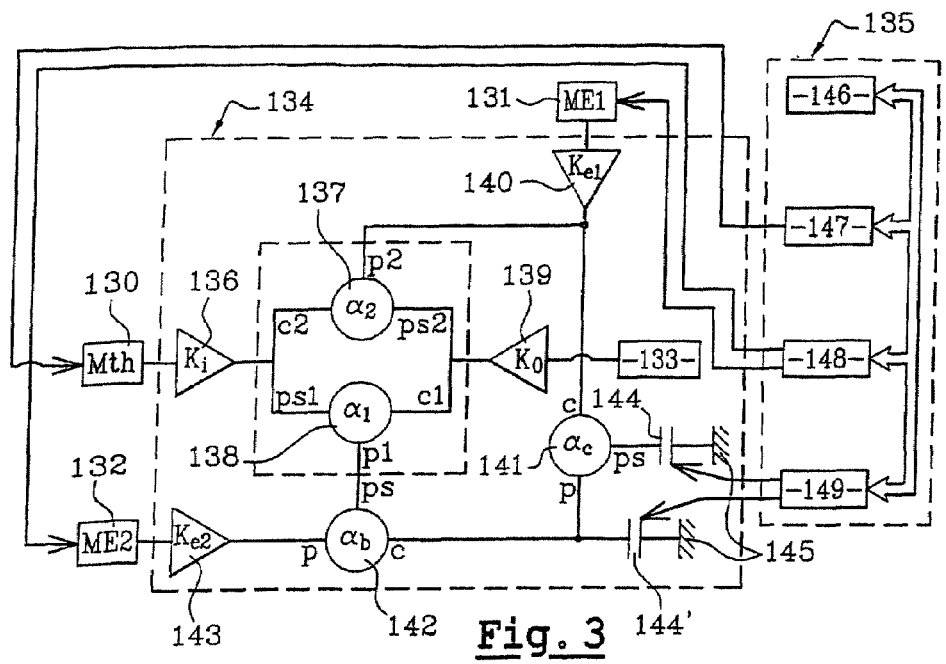
FIGS. 3 and 4 are respectively a basic diagram and a mechanical layout diagram of the infinitely variable transmission of the invention.

FIG. 3 illustrates the basic diagram of the present invention.

The infinitely variable transmission of the present invention is provided with a primary power train and a secondary power-splitting train.

For the purpose of constructing such a structure, internal combustion engine 130 is connected via a reducing stage 136 to ring gear C2 and to planet carrier ps respectively of a first epicyclic gearset 137 and of a second epicyclic gearset 138 of gearbox 134 proper.

Vehicle wheels 133 are connected to gearbox 134 via a reducing stage 139 of gear ratio $K_0$, one access of which is coupled respectively to planet carrier ps2 and to ring gear C1 of first epicyclic gearset 137 and of second epicyclic gearset 138.

The combination of first and second epicyclic gearsets 137 and 138 respectively constitutes a compound epicyclic gearset.

The power pathway formed in this way and connecting internal combustion engine 130 to wheels 133 of the vehicle constitutes the primary pathway.

In order to achieve continuous variation of the transmission ratio in the mode chosen between two modes of operation such as described in the foregoing, the infinitely variable transmission of the invention is provided with an electric variator composed of a first electric machine 131 and a second machine 132.

As has already been described, the electric variator is also supplemented by an electrical energy storage element (not illustrated), to which there are connected the two electric machines 131 and 132, which are electrically and mechanically reversible.

First electric machine 131 is connected to a reducing stage 140, which introduces a reduction ratio $K_{e1}$, and is respectively coupled to sun gear p2 of first epicyclic gearset 137 and to ring gear C1 of a third epicyclic gearset 141.

Third epicyclic gearset 141 is provided with a sun gear p, which is coupled to ring gear C of a fourth epicyclic gearset 142, such that sun gear p of third epicyclic gearset 141 and ring gear C of fourth epicyclic gearset 142 are connected to the frame or to any other fixed point 145 via brake 144'.

The planet carrier of third epicyclic gearset 141 is itself coupled to such a fixed point 145 by means of a brake 144.

Fourth epicyclic gearset 142 is provided with a sun gear p, which is coupled via a reducing stage 143 with gear ratio $K_{e2}$ to second electric machine 132 of the electric variator of the transmission of the invention.

In order to control the infinitely variable transmission of the invention, the internal combustion engine, the electric variator 131, 132 and the two brakes 144 and 144' of gearbox 134 proper are adjusted via a two-mode infinitely variable transmission controller 135.

Controller 135 is provided with a controller 146 of the operating point of the motive power unit as a function of predetermined stresses. These stresses depend in particular on the condition of the environment of the vehicle, in particular its speed and the previously adjusted operating point, and on the operator's adjustment, such as the degree of depression of the accelerator pedal, or else on the adjusting signal of an automaton to adjust the vehicle speed, for example.

A controller 147 of the operating point of internal combustion engine 130 receives an operating point target value from controller 135 and generates adjusting signals suitable for actuators for determination of the operating point of internal combustion engine 130. In one embodiment, such an actuator is implemented by the butterfly valve of the carburetor.

An operating controller 148 of first and second electric machines 131 and 132 respectively makes it possible to determine, for each machine, whether its mode of operation will be that of a motor or generator. On the basis of this determined mode of operation, the controller determines, for each machine, its speed of rotation and/or its torque or else its armature voltage and/or its armature current. In a preferred embodiment, the two reversible electric machines are electrically charged by means of an electrical energy accumulator, which cooperates with a device for management of an electrical energy accumulator. Controller 148 receives a target value of the operating point from controller 135 and produces suitable adjusting signals for the pilot-control circuits of the electric machines. Such pilot-control circuits make it possible to regulate the supply of the armature of the motor or else to orient the electrical energy produced in generator mode of operation.

A transmission-mode-changing controller 149 determines the open or closed state of first brake 144 and/or of second brake 144' in such a way that one mode among at least two modes of operation of the infinitely variable transmission is selected by an adjusting signal of controller 135, as described in the foregoing.

Figure 4:
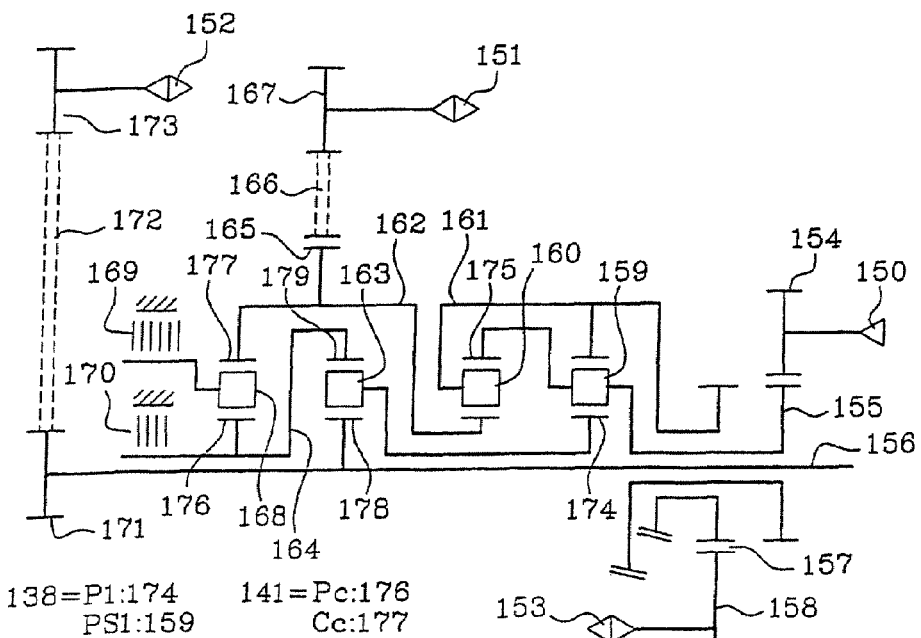

FIG. 4 illustrates a mechanical embodiment of the basic diagram of gearbox 134 of FIG. 3. This figure is substantially a half view that is symmetric relative to its axis 156 of rotation.

Internal combustion engine 150 is connected to a pinion 154 in such a way as to form, together with a toothing 155, a reducing stage analogous to reducing stage 136 of FIG. 3.

Toothing 155 is mounted on a bearing that is free to rotate around a central gearbox shaft 156.

Toothing 155 is integral with planet carrier 159 (PS1, FIG. 3) of the second epicyclic gearset 138 in FIG. 3, which thus constitutes the first gearset of the compound gearset of the primary power train of the invention.

The second epicyclic gearset 138 is provided with a sun gear 174 (P1 in FIG. 3) and with a ring gear 161 (C1 in FIG. 3).

First epicyclic gearset 137 in FIG. 3 is provided with a sun gear 162 (P2 in FIG. 3), a planet carrier 160 (PS2 in FIG. 3) and a ring gear 175 (C2 in FIG. 3).

Planet carrier 159 of second epicyclic gearset 138 is integral with ring gear 175 of first epicyclic gearset 137.

Ring gear 161 of second epicyclic gearset 138 is connected to or integral with planet carrier 160.

There has therefore been achieved a compact compound gearset disposed coaxially around a central shaft of gearbox 156.

In FIG. 4, only the upper part of this schematic view has been illustrated, in order to simplify the clarity of the description.

The wheels of the vehicle are coupled on a shaft 153 via pinion 158 to toothing 157, integral with ring gear 161 of second epicyclic gearset 138.

Toothing 157 is represented as a gearbox output pinion.

In this way, by means of the compound gearset described in the foregoing, the primary power train makes it possible to connect wheels 153 to internal combustion engine 150.

There are then illustrated third and fourth epicyclic gearsets 141 and 142 respectively, which make it possible to achieve the secondary power train as well as its coupling to the variator, to the mode-changing system and to the primary power train.

The third epicyclic gearset 141 of the gearbox of the invention is provided with a sun gear 176 (PC in FIG. 3) and a ring gear 177 ($C_c$ in FIG. 3).

Planet carrier 168 of third epicyclic gearset 141 is integral with brake 169 analogous to brake 144 of FIG. 3.

Fourth epicyclic gearset 142 is implemented here with a planet carrier 163, which connects sun gear 178 to ring gear 179.

To achieve power splitting and manipulations by the mode-changing system, sun gear 176 of third epicyclic gearset 141 is integral with ring gear 179 of fourth epicyclic gearset 142.

Similarly, ring gear 177 of third epicyclic gearset 141 is integral with sun gear 162 of the first epicyclic gearset 137.

Sun gear 176 of third epicyclic gearset 141 as well as ring gear 179 of the fourth epicyclic gearset are made integral with a first lining of a brake 144' of FIG. 3, the other lining of brake 170 being integral with the gearbox case. A brake actuator (not illustrated) makes it possible to activate or not activate braking by bringing the two linings together in response to an adjusting signal from the transmission's mode-of-operation controller (135, 149). Planet carrier 168 of the third epicyclic gearset (ps, 141), integral with ring gear 179 of the fourth epicyclic gearset (c, 142), is integral with a first lining of a brake 169, the other lining of brake 169 being integral with the gearbox case. A brake actuator (not illustrated), associated with brake 169 of planet carrier 168, makes it possible to activate or not activate braking thereof by bringing the two linings together in response to an adjusting signal from the transmission's mode-of-operation controller (135, 149).

Shaft of gearbox 156 is terminated at its other end relative to internal combustion engine 150 by a pinion 171, which is connected to second electric machine 152 via a pinion 171 connected to pinion 173 via a chain 172.

Pinion 173 drives the shaft of the rotor of electric machine 152.

Similarly, sun gear 162 of first epicyclic gearset 137 (FIG. 3) of the compound gearset carries an external toothing 165, which is coupled via a chain 166 to a pinion 167 integral with the shaft of the rotor of first electric machine 151 of the electric variator of the infinitely variable transmission of the invention.

In this way there has been mechanically achieved a gearbox with which the first and second electric machines can be easily integrated externally and in which the mode-changing system is composed essentially of the two brakes 169 and 170.

The two electric machines 151, 152 of the electric variator and the two brakes 169, 170 of the mode-changing system can be integrated.

In addition, the elements having the highest speed of rotation were disposed with high step-down ratios, thus making it possible to lower the maximum values permissible in the gearbox.

Figure 5:
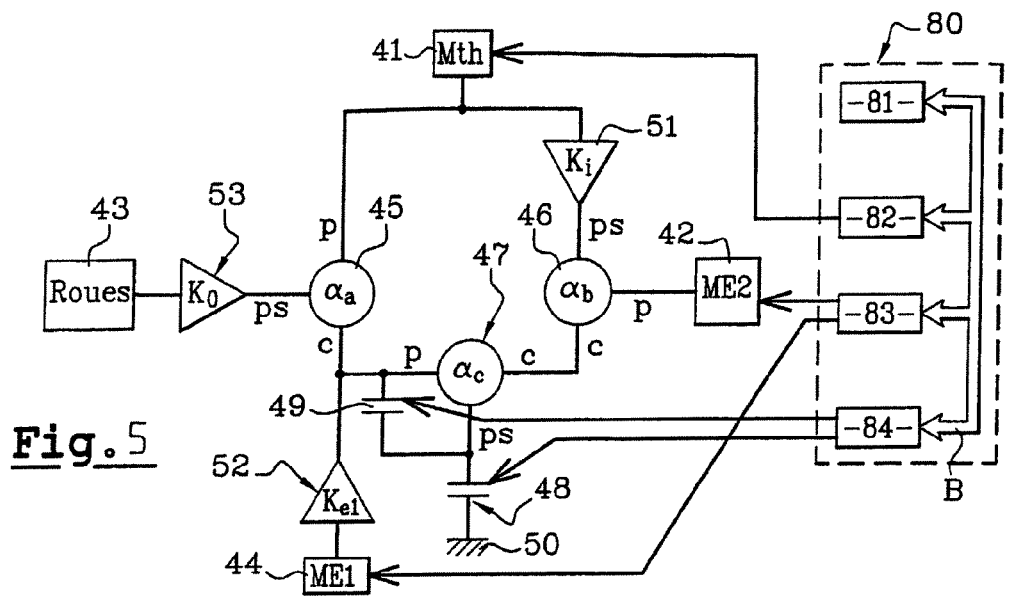
FIGS. 5 and 6 are respectively a basic diagram and a kinematic diagram of a preferred embodiment of the present invention.

In FIG. 5, internal combustion engine 41 is able to split off the mechanical power by a first power train composed of a first epicyclic gearset 45 to which it is connected by the sun gear (access reference P).

Planet carrier ps of epicyclic gearset 45 is connected to wheels 43 of the vehicle via a reducing stage 53, which applies a reduction coefficient $K_0$ to the speed of rotation.

In addition, internal combustion engine 41 can transfer mechanical power not only to driving wheels 43 of the vehicle in particular but also to first and second electric machines 42 and 44, via a second power train, which is provided with a reducing stage 51, which has a reduction coefficient $K_i$ and whose output is connected to planet carrier ps of second epicyclic gearset 46.

Sun gear p of second epicyclic gearset 46 is connected to the rotor of second electric machine 42.

According to the invention, in this second power train there is inserted a third epicyclic gearset 47 in series with second epicyclic gearset 46 by its ring gear c, which is connected to ring gear c of second epicyclic gearset 46.

In order to reassemble the two power trains, ring gear c of first epicyclic gearset 45 and sun gear p of third epicyclic gearset 47 are joined and connected also to a reducing stage 52, which has a speed ratio $K_{e1}$ and is connected to the other electric machine 44.

According to the invention, the mode-changing device or system is provided essentially with a brake 48 and a clutch 49, brake 48 is disposed between planet carrier ps of third epicyclic gearset 47 and case 50 of the infinitely variable transmission, and clutch 49 is disposed between planet carrier ps of third epicyclic gearset 47 and the point common to ring gear c of first epicyclic gearset 45 and to sun gear p of third epicyclic gearset 47.

In this architecture, the infinitely variable transmission of the invention has two modes of operation, which are:
a first mode, achieved when the brake is closed,
a second mode, achieved when the clutch is closed.

By virtue of the functional scheme of the present invention, matching of the infinitely variable transmission with different engines of the same power and having different maximum speeds of rotation can be achieved by matching solely the single reducing stage 51, by choosing a suitable ratio $K_i$.

When clutch 49 is closed, sun gear p and planet carrier ps of third epicyclic gearset 47 being blocked or rather joined together, gearset 47 revolves as a block. All the elements of third epicyclic gearset 47, comprising sun gear p, ring gear c and planet carrier ps, spin at the same speed. Third epicyclic gearset 47 then does not introduce any speed-step-down ratio.

When brake 48 is clamped, the element of the third epicyclic gearset 47 on which it is applied, in this case the planet carrier ps, the gearset bears on case 50 and introduces a step-down ratio.

This arrangement also makes it possible to temporarily clamp the two couplers 48 and 49 during changes of mode.

In this way, it is possible to achieve a mode-changing system without interrupting the flow of torque.

When brake 48 is clamped, third epicyclic gearset 47 achieves a step-down ratio equal to its gear ratio, or in other words to the ratio of the number of teeth of ring gear c to the number of teeth of sun gear p.

In the second mode, in which clutch 49 is closed, third gearset 47 does not introduce any step-down ratio.

The infinitely variable transmission of the invention is provided with a controller 80 of its operation, which is connected by a bus B to a plurality of controllers or adjusting circuits of which it is composed.

Controller 80 is provided with a controller 81 of the operating point of the motive power unit as a function of predetermined stresses. These stresses depend in particular on the condition of the environment of the vehicle, in particular its speed and the previously adjusted operating point, and on the operator's adjustment, such as the degree of depression of the accelerator pedal, or else on the adjusting signal of an automaton to adjust the vehicle speed, for example.

A controller 82 of the operating point of internal combustion engine 41 receives an operating point target value from controller 81 and generates adjusting signals suitable for actuators for determination of the operating point of internal combustion engine 41. In one embodiment, such an actuator is implemented by the butterfly valve of the carburetor.

An operating controller 83 of first and second electric machines 44 and 42 respectively makes it possible to determine, for each machine, whether its mode of operation will be that of a motor or generator. On the basis of this determined mode of operation, the controller determines, for each machine, its speed of rotation and/or its torque or else its armature voltage and/or its armature current. In a preferred embodiment, the two reversible electric machines are electrically charged by means of an electrical energy accumulator, which cooperates with a device for management of an electrical energy accumulator. Controller 83 receives a target value of the operating point from controller 81 and produces suitable adjusting signals for the pilot-control circuits of the electric machines. Such pilot-control circuits make it possible to regulate the supply of the armature of the motor or else to orient the electrical energy produced in generator mode of operation.

A transmission-mode-changing controller 84 determines the open or closed state of clutch 49 and/or of brake 48 in such a way that one mode among at least two modes of operation of the infinitely variable transmission is selected by an adjusting signal of controller 81, as described in the foregoing.

Figure 6:
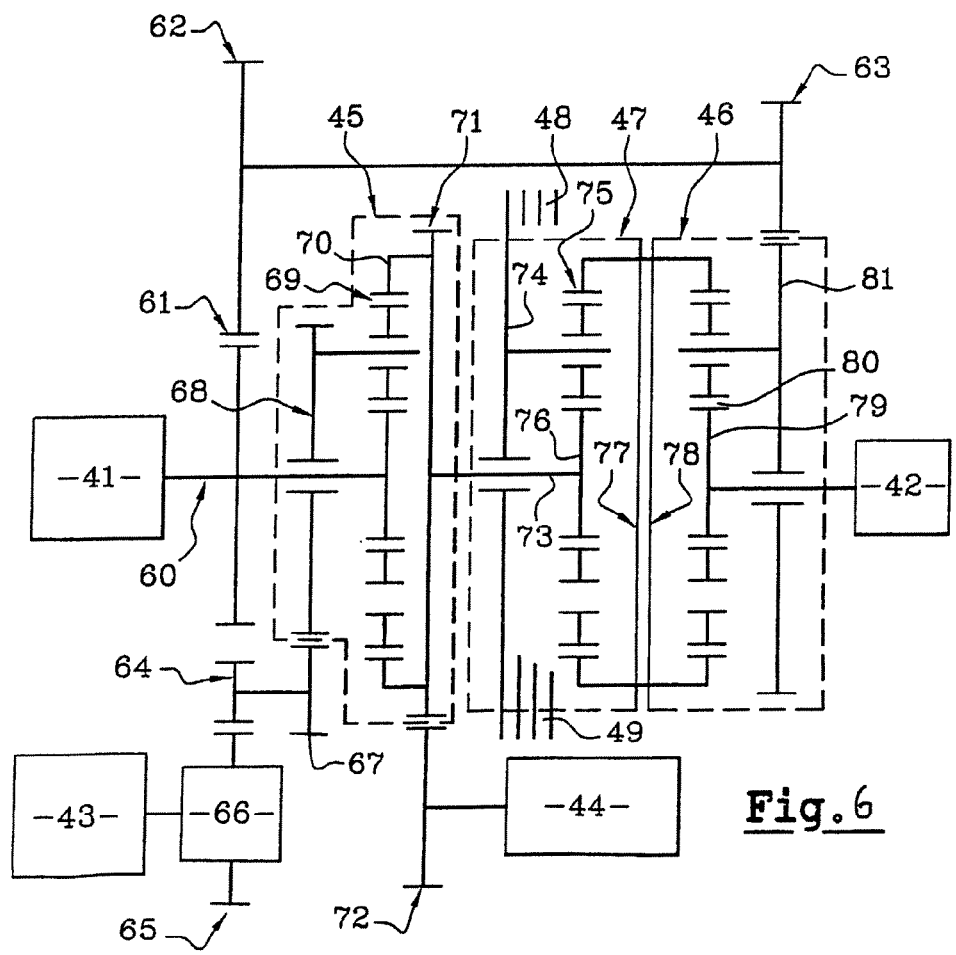

FIG. 6 illustrates the kinematic diagram of an embodiment of the invention illustrated in FIG. 5.

The same elements as those of FIG. 5 are identified with the same reference numerals.

The two electric machines 42 and 44 are not disposed on the same line as internal combustion engine 41, and they can be disposed along the engine shaft, as viewed face on, with an angular offset determined by the space-requirement plans both of the IVT and of the motive power unit equipped therewith, and of the space requirement of the engine performance of the vehicle.

In addition, it is pointed out that it has been possible to insert third epicyclic gearset 47 between the first and second epicyclic gearsets 45 and 46 respectively of the prior art architecture without necessitating any particular lengthening of the infinitely variable transmission.

Output shaft 60 of internal combustion engine 41 is integral with a gear 61 engaged on a gearset composed of a gear 62 mounted on a spindle containing a gear 63.

The ratio of the number of teeth of gears 61 and 62 can be matched in such a way as to produce a reducing stage equivalent to the reducing stage of the diagram of FIG. 5 variable as a function of the speed matching in such a way as to make the infinitely variable transmission of the invention function in its optimal range at maximum speed.

Output shaft 60 of internal combustion engine 41 is connected at the shaft end to the sun gear of first epicyclic gearset 45, planet carrier 68 rotates freely around engine shaft 60, and planets 69 are engaged between ring gear 70 and the sun gear.

Ring gear 70 of first epicyclic gearset 45 is provided with an external toothing coupled to a pinion 72 integral with the shaft of the rotor of first electric machine 44.

The reduction ratio between the number of teeth of gears 72 and 71 makes it possible to synthesize the reduction ratio $K_{e1}$ of reducing stage 52 of the diagram of FIG. 5.

In addition, planet carrier 68 of first epicyclic gearset 45 is provided with an external toothing engaged on a first gear 67 axially integral with a second gear 64, which is coupled to input pinion 65 of differential 66 connected to wheels 43.

In this way there is established a reducing stage of gear ratio $K_0$ analogous to reducing stage 53 (see FIG. 5).

Ring gear 70, 71 of first epicyclic gearset 45 is integral with sun gear 76 of third epicyclic gearset 47 via a shaft 73, which traverses planet carrier 74 of third epicyclic gearset 47.

Planet carrier 74 of third epicyclic gearset 47 has a lining, which is schematically represented at 48 and which can be activated by brake 48.

Electric machine 42 has an output shaft, which is connected to sun gear 79 of second epicyclic gearset 46, whose planet carrier 81 is engaged on ring gear 78 integral with ring gear 77 of third epicyclic gearset 47.

Conversely, in the second mode of operation, the first branch is closed and the second branch is open.

Figure 7:
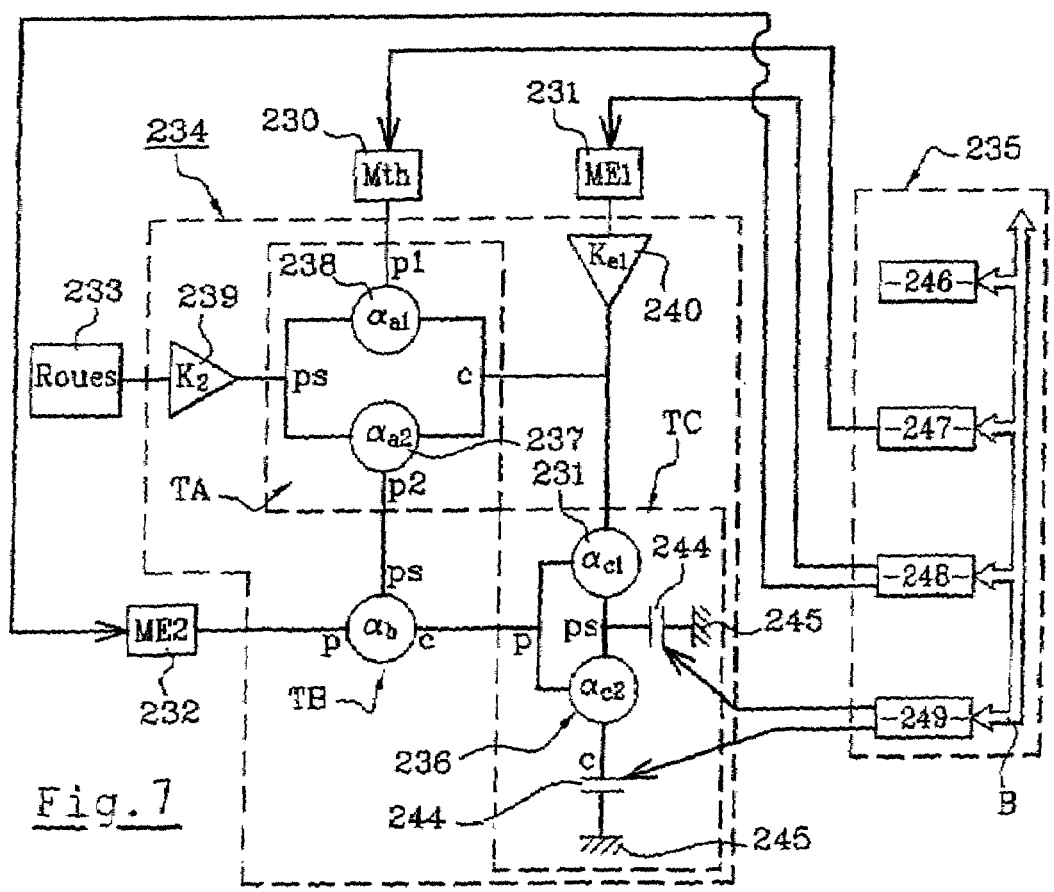
FIG. 7 is another basic diagram of the present invention.

FIG. 7 illustrates another basic diagram of an infinitely variable transmission implementing the invention.

Internal combustion engine 230 has an output shaft, which is connected to a first compound gearset TA implemented in gearbox 234 or belonging to the infinitely variable transmission proper.

First compound gearset TA is provided with a first epicyclic gearset 238, to which internal combustion engine 230 is connected via its sun gear P1.

Planet carrier ps of first epicyclic gearset 238 of compound gearset TA is connected to a reducing stage 239 and applies a specified reduction ratio $K_2$, the output being connected to driving wheels 233 of the vehicle.

In addition, planet carrier ps of first epicyclic gearset 238 is connected to the planet carrier of a second epicyclic gearset 237 of first compound gearset TA.

The ring gears of the first and second epicyclic gearsets 238 and 237 respectively are connected together, and their common movement is transmitted at a coupling over the secondary power-splitting train.

Sun gear P2 of second epicyclic gearset 237 is itself connected to planet carrier ps of an epicyclic gearset TB, whose sun gear p is connected to the rotary shaft of a second electric machine 232.

A first electric machine 231 is coupled via its output shaft to a reducing stage 240, which applies a reduction ratio $K_{E1}$ and is connected both to the ring gears of first and second epicyclic gearsets 238 and 237 respectively and to the ring gear of a first epicyclic gearset of a second compound gearset TC.

Second compound epicyclic gearset TC is also provided with a second epicyclic gearset 236 configured in such a way that the planet carriers and the sun gears of its two epicyclic gearsets 231 and 236 are coupled to one another.

Planet carriers PS are temporarily integral with a frame or chassis 245 by means of a first brake 244, while the ring gear of second epicyclic gearset 236 can be made integral with the chassis or fixed point 245 by means of a second brake 244'.

The sun gears of epicyclic gearsets 231 and 236 of compound gearset TC are connected to the ring gear of epicyclic gearset TB.

Gearbox 234 is controlled by means of a controller 235, which is provided essentially with a transmission calculator 246, an internal combustion engine controller 247, an electric variator controller 248 and a mode-changing controller 249.

These various components of controller 235 are connected to different sensors of the state of operation of the vehicle as well as to sensors for detecting the operator's intent, such as a sensor for the degree of depression of the accelerator pedal. This sensor is then connected to a module for detecting the intent or wish of the operator. The link is assured by means of a bus system B.

Mode-change controller 249 is provided with a first output, which is transmitted to an actuator of brake 244, and with a second output, which is coupled with an actuator of second brake 244'.

Such a mode-change controller produces, as a function of adjusting signals 246, output signals capable of assuming four states, as follows: a first state in which both output signals are inactive, second or third states in which one or the other of the output signals is active, and a fourth state in which both output signals are active.

Controller 248 of the electric variator produces at least two adjusting and/or control signals destined for each of the electric machines 231 and 232 in order to determine their respective operating points according to a four-quadrant current voltage rule I.

Preferably the electric variator is supplemented by an electrical energy storage element (not illustrated), such as the vehicle battery or a high-value capacitor, which is managed by a charging and discharging circuit (not illustrated) under the control of controller 249.

Such a mode-changing system composed of a compound gearset TC and of the two brakes 244, 244' makes it possible to simplify the mechanical mode-changing construction without necessitating a supplementary shaft, and it facilitates installation of electric machines on gearbox 234.

First and second brakes 244 and 244' respectively can be disposed at the end of gearbox 234, whereas the prior art clutches, when used to implement the mode-changing system, must necessarily be disposed at the center of this gearbox.

Compound gearset TA offers more possibilities for the step-down ratio and in particular a specific step-down ratio that makes it possible to reduce the speed of rotation of the elements of second compound gearset TC or splitting gearset.

Such an architecture permits three operating states depending on whether the brakes are open or clamped.

In the first mode of operation, brake 244 blocks planet carrier PS of the two epicyclic gearsets 231 and 236.

Ring gear C of second epicyclic gearset 236 spins freely, and gearset TC functions as a simple gearset composed of the ring gear of first epicyclic gearset 231 of common planet carrier PS and of common sun gear P.

In a second state, the mode-changing system is disposed in such a way that the two brakes 244 and 244' are both clamped.

By virtue of this fact, all elements of compound gearset TC are blocked, and it is therefore immobilized.

In this second mode, the two electric machines 231 and 232 are directly connected to the primary power-splitting train, and either one or the other or both can operate both as a generator and as a motor.

This configuration is established without blockage or mechanical interruption of the transmission during a change of mode.

In a third mode, first brake 244 is open and second brake 244' is clamped.

In this configuration, ring gear C of second epicyclic gearset 236 is braked and functions as a support point.

In this mode, the step-down ratio is a compound ratio that is a function of the number of teeth of all the spinning elements comprising ring gear C, planet carrier PS and sun gear C of compound gearset TC.

In this configuration, the transmission benefits from a very broad range of achievable step-down ratios.

In this basic diagram, the internal combustion engine is directly connected without reduction to one of the inputs of compound gearset TA of the primary train.

The epicyclic gearsets are therefore all on the same line, which makes the transmission particularly suitable for motive power unit architectures with high degree of motorization.

In addition, the double gearset of the secondary train, composed of simple gearset TB and of compound gearset TC, makes it possible to obtain a broad range of step-down ratio.

Figure 8:
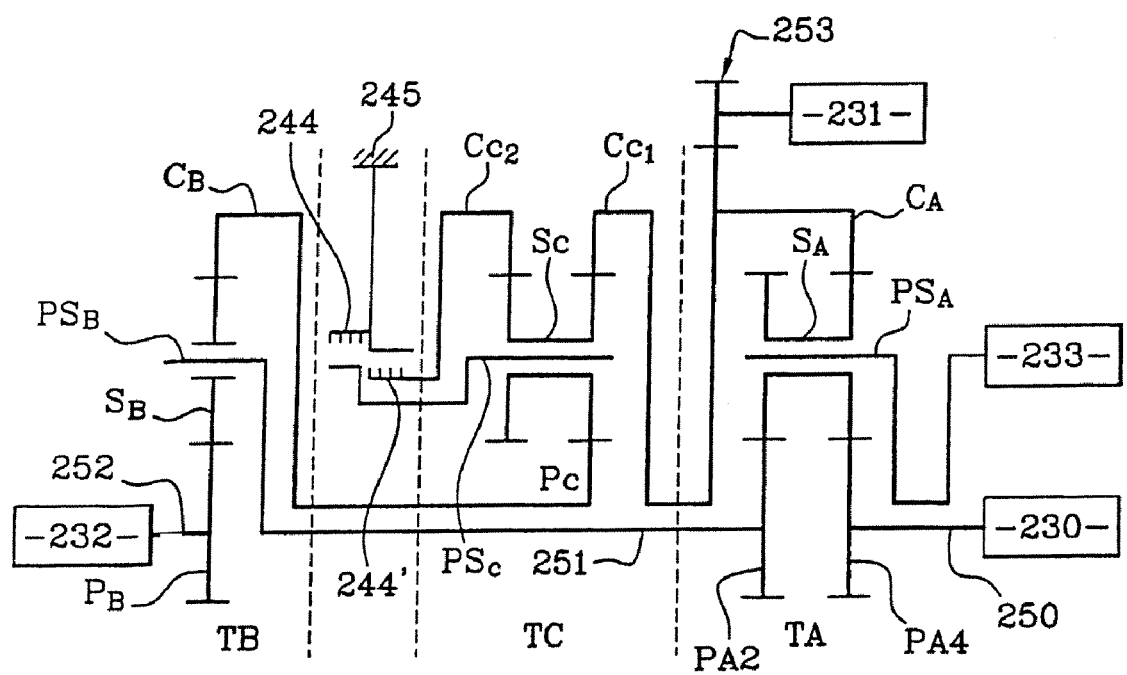
FIG. 8 is a kinematic diagram of a mechanical embodiment of the invention illustrated in FIG. 7.

FIG. 8 illustrates a mechanical layout diagram of a gearbox using the basic configuration of gearbox 234 of FIG. 7.

In this FIG. 8, the same elements as those of FIG. 7 are identified with the same reference numerals and are not further described.

Output shaft 250 of internal combustion engine 230 is aligned with common shaft 251 of rotation of primary compound gearset TA, of compound mode-changing gearset TC and of simple gearset TB for recombination of the two splitting trains.

Via this shaft 250, internal combustion engine 230 is therefore directly connected without intermediate reducing stage to sun gear $PA_1$ of first epicyclic gearset 238 (FIG. 7).

Planet carrier $PS_A$ is double and common to the two epicyclic gearsets 237, 238 of first compound gearset TA. Planet carrier $PS_A$ is spinning on sun gear $P_{A1}$ of epicyclic gearset 238 (FIG. 7), fixed at the end of shaft 250 of internal combustion engine 230, and it is spinning on sun gear $PA_2$ of second epicyclic gearset 237 (FIG. 7) of compound gearset TA, fixed on a first part of shaft 251.

The second part of shaft 251 carries planet carrier $PS_B$ of simple gearset TB.

Common shaft 251 carries the following components, which can rotate freely and are mounted on two suitable bearings:
   ring gear CA, which is common to the two epicyclic gearsets 238, 237 of first compound gearset TA, and ring gear CC1 of first epicyclic gearset 231 of second compound gearset TC;
   sun gear PC of second compound gearset TC, integral with ring gear CB of simple gearset TB.

In this embodiment, ring gear CA of the two epicyclic gearsets 238 and 237 of the first compound gearset is provided with a single toothing to drive a single pinion of sun gear SA mounted on planet carrier $PS_A$. Each planet gear SA of planet carrier $PS_A$ is double, meaning that it carries:
   a first pinion engaged between sun gear $PA_1$ of epicyclic gearset 238 and the single toothing, in this case internal, of ring gear CA, common to the two epicyclic gearsets;
   a second pinion integral with the first pinion via their common spindle and engaged on sun gear $PA_2$ of second epicyclic gearset 237 of first compound gearset TA.

Planet carrier $PS_A$ of the first compound gearset is mounted to rotate freely on a suitable bearing disposed on output shaft 250 of internal combustion engine 230. Planet carrier $PS_A$ is integral with a toothed gear engaged on a pinion integral with vehicle wheels 233.

In this embodiment, ring gear CA also carries an external toothing, which is engaged with a pinion 253 mounted at the end of the shaft of the rotor of first electric machine 231 of the electric variator.

In this embodiment, sun gear PC common to the two epicyclic gearsets 231 and 236 is provided with a single external toothing to drive a single pinion of planet gear SC mounted on planet carrier PS of second compound gearset TC. Each planet gear SC of planet carrier PS is double, meaning that it carries:
   a first pinion engaged on sun gear PC on the one hand and on an internal toothing of ring gear CC1 of epicyclic gearset 231 (FIG. 7) integral with common ring gear CA of first compound gearset TA;
   a second pinion, integral with the first pinion via their common spindle and engaged on an internal toothing of ring gear CC2 of second epicyclic gearset 236 (FIG. 7) of second compound gearset TC.

Planet carrier PSC of the second compound gearset is mounted to rotate freely between sun gear PC of second compound gearset TC and ring gear CC1 of its first epicyclic gearset 231 (FIG. 7).

Shaft 251 carries planet carrier $PS_B$ of simple gearset TB, which spins on sun gear PB, whose shaft 252, aligned with shafts 251 and 250, is connected to second electric machine 232.

Gearsets 244 and 244' have been schematically represented in the axial gap between simple gearset TB and second compound gearset TC.

First brake 244 is provided with a first lining integral with ring gear CC2 of second epicyclic gearset 236 of second compound gearset TC and a second lining integral with case 245 of the gearbox. A brake actuator (not illustrated) is disposed between the two linings in such a way that, in response to the adjusting signal from transmission-mode-changing controller 249, first brake 244 is either opened or clamped.

Second brake 244' is provided with a first lining integral with planet carrier PSC of second compound gearset TC and a second lining integral with case 245 of the gearbox. A brake actuator (not illustrated) is disposed between the two linings in such a way that, in response to the adjusting signal from transmission-mode-changing controller 249, second brake 244' is either opened or clamped.

It is noted that the mode-changing system could be installed outside this space requirement in order to further narrow the axial or longitudinal extent of such a gearbox. In this case, the two brakes 244 and 244' are spaced apart from central shaft 251.

The mode-changing system is achieved in compact form, since compound gearset TC and braking part 244, 244', 245 can be integrated separately.

The invention claimed is:

1. A power-splitting infinitely variable transmission, comprising:
   a primary power train on which there is disposed a compound gearset including a first epicyclic gearset and a second epicyclic gearset;
   a secondary power train provided with a third epicyclic gearset and a fourth epicyclic gearset associated with electric machines including a first electric machine and a second electric machine of an electric variator, and the first electric machine of the electric variator is connected to a first reducing stage coupled to a sun gear of the first epicyclic gearset and to a ring gear of the third epicyclic gearset; and
   a mode-changing system configured to selectively immobilize at least one spinning element of one of the epicyclic gearsets associated with one of the electric machines, such that at least one mode of operation of the infinitely variable transmission is selected among a plurality of modes of operation, wherein
   an internal combustion engine is connected via a second reducing stage to a ring gear of the first epicyclic gearset and to a planet carrier of the second epicyclic gearset of a gearbox.

2. A transmission according to claim 1, further comprising:
   an operating controller including
     a motive power unit controller of an operating point of a motive power unit as a function of predetermined stresses,
     an engine controller of an operating point of the internal combustion engine configured to receive an operating point target value from the operating controller and configured to generate adjusting signals suitable for actuators for determination of the operating point of the internal combustion engine,
     an electric machine operating controller of the electric machines such that, for each of the electric machines, there is determined a mode of operation either as a motor or generator, a speed of rotation or a torque or else an armature voltage or an armature current, in relation with a device for management of an electrical energy accumulator, the electric machine operating controller receiving a target value of the operating point from the operating controller and producing suitable adjusting signals for pilot-control circuits of the electric machines, and
     a transmission-mode-changing controller, which determines an open or closed state of a first brake or of a second brake such that one mode among at least two modes of operation of the infinitely variable transmission is selected by an adjusting signal of the operating controller.

3. A transmission according to claim 1, wherein
   vehicle wheels are connected to the gearbox via a third reducing stage having a first gear ratio, one access of which is coupled respectively to a planet carrier of the first epicyclic gearset and to a ring gear of the second epicyclic gearset.

4. A transmission according to claim 3, wherein
   a sun gear of the third epicyclic gearset is coupled to a ring gear of the fourth epicyclic gearset,
   the sun gear of the third epicyclic gearset and the ring gear of the fourth epicyclic gearset are connected to a frame via a first brake, and
   a planet carrier of the third epicyclic gearset is coupled to the frame by a second brake.

5. A transmission according to claim 3, wherein the second electric machine of the electric variator is coupled via a fourth reducing stage with a second gear ratio to the fourth epicyclic gearset by a sun gear of the fourth epicyclic gearset.

6. A transmission according to claim 1, wherein
   the second reducing stage is provided with a pinion engaged with a toothing mounted on a bearing that is free to rotate around a central gearbox shaft integral with the planet carrier of the second epicyclic gearset of the primary power train, and
   a planet carrier of the first epicyclic gearset is integral with a ring gear of the second epicyclic gearset.

7. A transmission according to claim 6, wherein vehicle wheels are coupled on a shaft via a pinion to a toothing, integral with the ring gear of the second epicyclic gearset.

8. A transmission according to claim 6, wherein
   the secondary power train is provided with the third and fourth epicyclic gearsets respectively, to couple the secondary power train to the electric variator, to the mode-changing system, and to the primary power train,
   the third epicyclic gearset is provided with a sun gear, the ring gear, and a planet carrier integral with a second brake,
   the fourth epicyclic gearset is provided with a planet carrier, which couples a sun gear of the fourth epicyclic gearset to a ring gear of the fourth epicyclic gearset,
   the sun gear of the third epicyclic gearset is integral with the ring gear of the fourth epicyclic gearset, and the ring gear of the third epicyclic gearset is integral with the sun gear of the fourth epicyclic gearset,
   the central gearbox shaft terminates at an opposite end relative to the internal combustion engine by a pinion connected to the second electric machine, and
   a sun gear of the second epicyclic gearset of the compound gearset carries an external toothing, which is coupled to a pinion integral with a shaft of a rotor of the first electric machine of the electric variator.

9. A transmission according to claim 8, wherein the sun gear of the third epicyclic gearset and the ring gear of the fourth epicyclic gearset are integral with a first lining of a first brake, a second lining of the first brake being integral with a gearbox case and a brake actuator, such that the brake actuator may activate or not activate braking by bringing the first lining and the second lining together in response to an adjusting signal from a mode-of-operation controller of the transmission.

10. A transmission according to claim 8, wherein the planet carrier of the third epicyclic gearset, integral with the ring gear of the fourth epicyclic gearset, is integral with a first lining of the second brake, a second lining of the second brake being integral with a gearbox case, and a brake actuator, such that the brake actuator may activate or not activate braking thereof by bringing the first lining and the second lining together in response to an adjusting signal from a mode-of-operation controller of the transmission.

11. A power-splitting infinitely variable transmission, comprising:
   a third epicyclic gearset in series with one of a first epicyclic gearset and a second epicyclic gearset on one of two power trains connecting an internal combustion engine in a parallel manner to wheels of a vehicle, the third epicyclic gearset cooperating with an adjusting means such that, in a first mode of two modes of operation of the transmission, a sun gear, a ring gear, and a planet carrier of the third epicyclic gearset are spinning at a same speed, wherein,
   on a first power train of the two power trains, the vehicle wheels are connected via a first reducing stage to a planet carrier of the first epicyclic gearset, and a sun gear of the first epicyclic gearset is connected directly to a shaft of the internal combustion engine, and
   a second power train of the two power trains is coupled to the first epicyclic gearset by a ring gear of the first epicyclic gearset.

12. A transmission according to claim 11, further comprising:
   an operating controller including
      a motive power unit controller of an operating point of a motive power unit as a function of predetermined stresses,
      an engine controller of an operating point of the internal combustion engine configured to receive an operating point target value from the operating controller and configured to generate adjusting signals suitable for actuators for determination of the operating point of the internal combustion engine,
      an electric machine operating controller of electric machines of the transmission such that, for each of the electric machines, there is determined a mode of operation either as a motor or generator, a speed of rotation or a torque or else an armature voltage or an armature current, in relation with a device for management of an electrical energy accumulator, the electric machine operating controller receiving a target value of the operating point from the operating controller and producing suitable adjusting signals for pilot-control circuits of the electric machines, and
      a transmission-mode-changing controller, which determines an open or closed state of a clutch or of a brake such that one mode of the at least two modes of operation of the infinitely variable transmission is selected by an adjusting signal of the operating controller.

13. A transmission according to claim 11, wherein
   the ring gear of the third epicyclic gearset is connected to a ring gear of the second epicyclic gearset, and
   the sun gear of the third epicyclic gearset is integral both with the ring gear of the first epicyclic gearset and with a rotor of a first electric machine.

14. A transmission according to claim 13, wherein a planet carrier of the second epicyclic gearset is connected to the internal combustion engine via a second reducing stage, and a reduction ratio of the second reducing stage can be matched to a mechanical power and to an optimal speed of rotation of the internal combustion engine to which the second reducing stage is connected.

15. A transmission according to claim 14, wherein a sun gear of the second epicyclic gearset is connected to a rotor of a second electric machine.

16. A transmission according to claim 13, wherein, by activation of a mode-changing system, the planet carrier of the third epicyclic gearset is immobilized on a case via a brake disposed between the case and the planet carrier of the third epicyclic gearset.

17. A transmission according to claim 16, wherein the planet carrier of the third epicyclic gearset is connected to the sun gear of the third epicyclic gearset via a clutch adjusted by the mode-changing system.

18. A transmission according to claim 11, wherein
   the second epicyclic gearset and the third epicyclic gearset are provided with a common ring gear, in that the planet carrier of the third epicyclic gearset spins freely around a shaft of the sun gear of the third epicyclic gearset, the shaft of the sun gear of the third epicyclic gearset being connected to a shaft carrying the common ring gear of the second epicyclic gearset and the third epicyclic gearset, in that a planet carrier of the second epicyclic gearset spins freely around a shaft of a sun gear of the second epicyclic gearset, the shaft of the sun gear of the second epicyclic gearset being connected to a shaft of a rotor of a second electric machine, and
   the planet carrier of the first epicyclic gearset spins freely around a shaft of the sun gear of the first epicyclic gearset, the shaft of the sun gear of the first epicyclic gearset being integral at two ends with the shaft of the internal combustion engine and with the sun gear of the first epicyclic gearset.

19. A transmission according to claim 18, wherein a first electric machine is disposed outside of a common axis of the internal combustion engine, of the first, second, and third epicyclic gearsets, respectively, and of the second electric machine, a rotor shaft of the first electric machine being integral with a pinion engaged on an external toothing of the ring gear of the first epicyclic gearset.

20. A power-splitting infinitely variable transmission, comprising:
   a first compound gearset configured to connect an internal combustion engine to vehicle wheels along a first power-splitting train;
   a second compound gearset that, along with the first compound gearset, is configured to achieve power splitting via a second power-splitting train; and
   a simple gearset configured to recombine the first and second power-splitting trains, wherein
   the first compound gearset, the second compound gearset, and the simple gearset achieve a system for changing modes between at least two modes of operation of the infinitely variable transmission, and
   the internal combustion engine is connected to a first epicyclic gearset of the first compound gearset via a sun gear of the first epicyclic gearset.

21. A transmission according to claim 20, further comprising:
   an operating controller connected by a bus to different sensors of a state of operation of a vehicle as well as to sensors for detecting an intent of an operator and to a plurality of controllers, including
a motive power unit controller of an operating point of a motive power unit as a function of predetermined stresses,
an engine controller of an operating point of the internal combustion engine configured to receive an operating point target value from the operating controller and configured to generate adjusting signals suitable for actuators for determination of the operating point of the internal combustion engine,
an electric machine operating controller of two electric machines in such a way that, for each of the two electric machines, there is determined a mode of operation either as a motor or generator, a speed of rotation or a torque or else an armature voltage or an armature current, especially in relation with a device for management of an electrical energy accumulator, the electric machine operating controller receiving a target value of the operating point from the operating controller and producing suitable adjusting signals for pilot-control circuits of the two electric machines in order to determine their respective operating points according to a four-quadrant current-voltage rule 1, and
a transmission-mode-changing controller, which determines an open or closed state of a first brake or of a second brake in such a way that one mode among at least three modes of operation of the infinitely variable transmission is selected by an adjusting signal of the operating controller, among which
in a first mode of operation of the at least three modes of operation, the first brake or the second brake blocks a planet carrier of first and second epicyclic gearsets of the second compound gearset, a ring gear of the second epicyclic gearset spins freely, and the second compound gearset functions as a simple gearset composed of a ring gear of first epicyclic gearset, of a common planet carrier of the second compound gearset, and of a common sun gear of the second compound gearset,
in a second mode of operation of the at least three modes of operation, the mode-changing system is disposed in such a way that the the first brake and the second brake are both clamped, all elements of the second compound gearset are blocked in such a way that the two electric machines are directly connected to the first power-splitting train, and either one or the other or both of the two electric machines can operate both as a generator and as a motor, and
in a third mode of operation of the at least three modes of operation, the first brake is open and the second brake is clamped, in such a way that the ring gear of the second epicyclic gearset of the second compound gearset is braked and functions as a support point.

22. A transmission according to claim 20, wherein
a planet carrier of the first epicyclic gearset being connected to a first reducing stage, the output of which is connected to driving wheels of the vehicle wheels and to a planet carrier of a second epicyclic gearset of the first compound gearset,
ring gears of the first and second epicyclic gearsets respectively are connected together, and
common movement of the ring gears is transmitted at a coupling over the second power-splitting train.

23. A transmission according to claim 22, wherein
a sun gear of the second epicyclic gearset is connected to a planet carrier of the simple gearset and a sun gear of the simple gearset is connected to a rotary shaft of a second electric machine,
a first electric machine of an electric variator of the transmission is coupled via an output shaft of the first electric machine to a second reducing stage connected both to the ring gears of the first and second epicyclic gearsets of the first compound gearset, as well as to a ring gear of a first epicyclic gearset of the second compound gearset, and
the second compound gearset includes a second epicyclic gearset and is configured in such a way that planet carriers and sun gears of the first and second epicyclic gearsets of the second compound gearset are coupled to one another in that the planet carriers of the second compound gearset are temporarily integral with a frame or chassis by means of a first brake, while a ring gear of the second epicyclic gearset of the second compound gearset can be made integral with the chassis or fixed point by means of a second brake, and in that the sun gears of the first and second epicyclic gearsets of the second compound gearset are connected to a ring gear of a third epicyclic gearset.

24. A transmission according to claim 22, wherein
an output shaft of the internal combustion engine is aligned with a common shaft of rotation of the first compound gearset, of a compound mode-changing gearset, and of the simple gearset for recombination of the first power-splitting train and the second power-splitting train,
the internal combustion engine is directly connected without intermediate reducing stage via the output shaft of the internal combustion engine to the sun gear of the first epicyclic gearset of the first compound gearset, the planet carrier of the first compound gearset being double and common to the first and second epicyclic gearsets of the first compound gearset, the planet carrier of the first compound gearset being spun on the sun gear of the first epicyclic gearset of the first compound gearset, fixed at an end of the output shaft of the internal combustion engine, spinning on the sun gear of the second epicyclic gearset of the first compound gearset, and fixed on a first part of the common shaft,
a second part of the common shaft is aligned with the output shaft and carries a planet carrier of the simple gearset,
the common shaft can rotate freely on two bearings and carries
the ring gears of the first and second epicyclic gearsets of the first compound gearset, and the ring gear of a first epicyclic gearset of the second compound gearset, and
a sun gear of the second compound gearset, which is integral with a ring gear of the simple gearset.

25. A transmission according to claim 24, wherein
the ring gears of the first and second epicyclic gearsets of the first compound gearset are provided with a single toothing to drive a single pinion of the sun gear mounted on the planet carrier of the first compound gearset, each planet gear of the planet carrier of the first compound gearset being double, meaning that the planet carrier of the first compound gearset carries
a first pinion engaged between the sun gear of the first epicyclic gearset and the single internal toothing of the ring gears of the first and second epicyclic gearsets, and a second pinion integral with the first pinion via their common spindle and engaged on the sun gear of the second epicyclic gearset of the first compound gearset, and the planet carrier of the first compound gearset is mounted to rotate freely on a bearing disposed on the output shaft of the internal combustion engine and is integral with a toothed gear engaged on a pinion integral with the vehicle wheels.

26. A transmission according to claim 25, wherein the ring gears of the first compound gearset also carries an external toothing, which is engaged with a pinion mounted at an end of a shaft of a rotor of a first electric machine of an electric variator.

27. A transmission according to claim 26, wherein the sun gear common to the first epicyclic and a second epicyclic gearset of the second compound gearset is provided with a single external toothing to drive a single pinion of the planet gear mounted on a planet carrier of the second compound gearset, each planet gear of the planet carrier of the second compound gearset being double, meaning that the planet carrier of the second compound gearset carries a first pinion engaged on the sun gear and on an internal toothing of the ring gear of the first epicyclic gearset of the second compound gearset integral with the ring gears of the first compound gearset, and a second pinion, integral with the first pinion via a common spindle of the first pinion and the second pinion and engaged on an internal toothing of a ring gear of the second epicyclic gearset of the second compound gearset, and the planet carrier of the second compound gearset is mounted to rotate freely between the sun gear and the ring gear of the first epicyclic gearset of the second compound gearset.

28. A transmission according to claim 27, wherein a shaft carries the planet carrier of the simple gearset, which spins on a sun gear of the simple gearset, and a shaft of the simple gearset is aligned with the shaft of the planet gear and is connected to a rotor of a second electric machine.

29. A transmission according to claim 28, wherein the system for changing modes includes a first brake provided with a first lining integral with the ring gear of the second epicyclic gearset of the second compound gearset and a second lining integral with a case of a gearbox, a brake actuator being disposed between the first and second lining of the first brake in such a way that, in response to an adjusting signal from a transmission-mode-changing controller, the first brake is either opened or clamped, and a second brake provided with a first lining integral with the planet carrier of the second compound gearset and a second lining integral with the case of the gearbox, a brake actuator being disposed between the first and second lining of the second brake in such a way that, in response to the adjusting signal from the transmission-mode-changing controller, the second brake is either opened or clamped.

* * * * *